United States Patent
Speidel (10) Patent No.: US 9,297,681 B2
(45) Date of Patent: Mar. 29, 2016

(54) ULTRASONIC MEASUREMENT APPARATUS HAVING TRANSDUCERS ARRANGED WITHIN A BULGE OF THE CHANNEL WALL PROTRUDING INTO THE FLOW CHANNEL

(71) Applicant: SICK AG, Waldkirch (DE)

(72) Inventor: Michael Speidel, Freiburg (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 14/567,606

(22) Filed: Dec. 11, 2014

(65) Prior Publication Data

US 2015/0177036 A1 Jun. 25, 2015

(30) Foreign Application Priority Data

Dec. 19, 2013 (DE) .......... 10 2013 114 475

(51) Int. Cl.
*G01F 1/66* (2006.01)
*G01F 15/18* (2006.01)

(52) U.S. Cl.
CPC *G01F 1/66* (2013.01); *G01F 1/662* (2013.01); *G01F 1/667* (2013.01); *G01F 15/18* (2013.01); *G01F 15/185* (2013.01)

(58) Field of Classification Search
None
See application file for complete search history.

(56) References Cited

U.S. PATENT DOCUMENTS

| | | | | |
|---|---|---|---|---|
| 3,751,979 A * | 8/1973 | Ims | .......... | G01F 1/662 73/861.27 |
| 4,103,551 A * | 8/1978 | Lynnworth | .......... | G01F 1/662 73/861.27 |
| 4,195,517 A * | 4/1980 | Kalinoski | .......... | G01F 1/66 73/861.27 |
| 4,397,194 A * | 8/1983 | Soltz | .......... | G01F 1/66 73/861.28 |
| 4,467,659 A | 8/1984 | Baumoel | | |
| 4,581,942 A * | 4/1986 | Ogura | .......... | A61M 16/08 73/861.28 |
| 6,748,811 B1 * | 6/2004 | Iwanaga | .......... | G01F 1/662 73/861.18 |
| 7,481,114 B2 * | 1/2009 | Lynnworth | .......... | G01N 29/024 73/861.27 |
| 8,904,881 B2 * | 12/2014 | Sonnenberg | .......... | G01F 1/662 73/861.27 |
| 8,997,584 B1 * | 4/2015 | Feller | .......... | G01F 1/662 73/861.26 |
| 2005/0139013 A1 * | 6/2005 | Hashimoto | .......... | G01F 1/662 73/861.27 |
| 2008/0034887 A1 * | 2/2008 | Rieder | .......... | G01F 1/662 73/861.28 |

(Continued)

FOREIGN PATENT DOCUMENTS

| | | | |
|---|---|---|---|
| DE | 4439399 A1 | 5/1996 | |
| DE | 19944411 A1 | 4/2001 | |

(Continued)

OTHER PUBLICATIONS

German Search Report dated Sep. 23, 2014 corresponding to application No. 102013114475.6.

*Primary Examiner* — Harshad R Patel
(74) *Attorney, Agent, or Firm* — Nath, Goldberg & Meyer; Jerald L. Meyer (57) ABSTRACT

An ultrasonic measurement apparatus (10) for determining a fluid velocity of a fluid (12) flowing in a piping (14) is provided, the apparatus (10) having a measurement body (20) inserted into the piping (14) and thus forming a section of the piping (14), the measurement body (20) comprising a flow channel (26) for the fluid (12) and a surrounding channel wall (24), wherein at least one ultrasonic transducer (18*a-b*) is mounted from the outside on the channel wall (24) so that an oscillating member of the transducer (18*a-b*) couples onto a partial region (30*a-b*) of the channel wall (24) and thus the partial region (30*a-b*) acts as an oscillating membrane of the ultrasonic transducer (18*a-b*). The ultrasonic transducer (18*a-b*) is arranged within a bulge (44) of the channel wall (24) which protrudes into the flow channel (26).

10 Claims, 4 Drawing Sheets

(56) References Cited

U.S. PATENT DOCUMENTS

| | | | | |
|---|---|---|---|---|
| 2008/0271544 A1* | 11/2008 | Rickli | ............... | G01F 1/662 |
| | | | | 73/861.28 |
| 2009/0095088 A1* | 4/2009 | Berger | ............... | G01F 1/662 |
| | | | | 73/861.25 |
| 2009/0100940 A1* | 4/2009 | Strunz | ............... | G01F 1/662 |
| | | | | 73/861.28 |
| 2010/0313676 A1* | 12/2010 | Straub, Jr. | ............ | G01F 1/667 |
| | | | | 73/861.28 |
| 2011/0209558 A1* | 9/2011 | Sugiura | ............. | G01F 1/662 |
| | | | | 73/861.18 |
| 2014/0102213 A1* | 4/2014 | Kuriaki | ............. | G01F 1/667 |
| | | | | 73/861.27 |
| 2014/0216167 A1* | 8/2014 | Nielsen | ............. | G01F 1/667 |
| | | | | 73/861.28 |

FOREIGN PATENT DOCUMENTS

| | | |
|---|---|---|
| DE | 102004060118 A1 | 6/2006 |
| DE | 102008019992 A1 | 10/2009 |
| DE | 102008055030 A1 | 7/2010 |
| EP | 0897101 A1 | 2/1999 |
| EP | 1378727 A1 | 1/2004 |
| EP | 2682719 A1 | 1/2014 |

* cited by examiner

ULTRASONIC MEASUREMENT APPARATUS HAVING TRANSDUCERS ARRANGED WITHIN A BULGE OF THE CHANNEL WALL PROTRUDING INTO THE FLOW CHANNEL

The invention relates to an ultrasonic measurement apparatus and a method for determining a fluid velocity of a fluid flowing in a piping.

Several measurement principles are known for determining the flow velocity or flow rate based on ultrasound. In a Doppler method, the frequency shift of an ultrasonic signal reflected by the flowing fluid is evaluated, which differs depending on the flow velocity. In a time of flight difference method, a pair of ultrasonic transducers is mounted at an outer circumference of the piping with a mutual offset in longitudinal direction, the ultrasonic transducers alternately transmitting and detecting ultrasonic signals transverse to the flow along a measurement path formed between the ultrasonic transducers. The ultrasonic signals transported through the fluid are accelerated or slowed down depending on the direction through the flow. The resulting time of flight difference together with geometrical parameters is used to calculate an average flow velocity of the fluid. The volume flow or flow rate is obtained from that using the sectional area. For more accurate measurement, a plurality of measurement paths each with a pair of ultrasonic transducers may be provided in order to cover a flow section at more than one point.

The ultrasonic transducers used for generating the ultrasound have an oscillating member, often a ceramic. By means of the oscillating member, an electric signal is for example transformed into ultrasound based on the piezoelectric effect, and vice-versa. Depending on the application, the ultrasonic transducers act as a sound source, a sound detector, or both.

A coupling between the fluid and the ultrasonic transducer has to be provided. A common solution is to have the ultrasonic transducer protrude into the piping in direct contact with the fluid. However, the immersed transducers are exposed to the fluid and its pressure and temperature and thereby may possibly be damaged. Conversely, the ultrasonic transducers may interfere with the flow and thus affect the accuracy of the measurement.

In some applications, in particular in the hygiene sector, there is a requirement to provide a closed surface at the inner wall with respect to the fluid so that deposits are avoided and a complete cleaning is possible. But even in common ultrasonic measurement devices with a metallic or stainless steel channel which in principle is suitable for such applications, the ultrasonic transducers are still mounted so as to protrude into the channel, and are acoustically and mechanically separated by a rubber seal. These seals regularly need to be replaced due to aggressive cleaning agents and therefore cause maintenance costs and down times. In addition, at irregularities caused by the ultrasonic transducer and their mounts, permanent deposits can be formed.

In principle, techniques are also known where the inner wall remains completely closed. An example is the so-called clamp-on mounting for example according to U.S. Pat. No. 4,467,659 used to mount the ultrasonic transducer to the piping from the outside. EP 1 378 272 B1 proposes to mount the ultrasonic generating elements on the outside of a wall. In contrast to the clamp-on technique, the wall is used as a membrane which in the region of the ultrasonic transducers forms a pocket with a considerably smaller wall thickness than the rest of the wall. This mounting also referred to as a clamp-in is a kind of intermediate form of rigid mounting in the interior of the pipe and the clamp-on mounting.

In order to achieve a good ultrasound coupling with these techniques, a close fit of the ultrasonic transducer on the piping and thus an at least nearly vertical mounting of the ultrasonic transducers is required. However, this leads to very steep ultrasonic paths which run through the piping with only slight deviation from a vertical line and are thus hardly longer than the diameter of the piping. In particular for small nominal diameters of the piping, these ultrasonic paths are too short for high measurement accuracy, because for example in a time of flight difference method the differences are too short. One could still contemplate to initially couple the ultrasound vertically and to then achieve a transmission angle which is small or even parallel to the flow by means of reflectors. These reflectors and their holders, however, are substantial sources of interference for the flow and moreover regions where permanent deposits may form.

It is therefore an object of the invention to increase the accuracy of an ultrasound measurement in the hygiene sector.

This object is satisfied by an ultrasonic measurement apparatus for determining a fluid velocity of a fluid flowing in a piping, the apparatus having a measurement body inserted into the piping and thus forming a section of the piping, the measurement body comprising a flow channel for the fluid and a surrounding channel wall, wherein at least one ultrasonic transducer is mounted from the outside on the channel wall so that an oscillating member of the transducer couples onto a partial region of the channel wall and thus the partial region acts as an oscillating membrane of the ultrasonic transducer, wherein the ultrasonic transducer is arranged within a pocket or bulge of the channel wall which protrudes into the flow channel.

The object is also satisfied by a method for determining a flow velocity of a fluid flowing in a piping, wherein an ultrasonic measurement is carried out while the fluid flows through a measurement body having a flow channel for the fluid and a surrounding channel wall, wherein an ultrasonic signal is coupled into the flow channel by an oscillating member of the ultrasonic transducer coupling onto a partial region of the channel wall and thus the partial region acting as an oscillating membrane of the ultrasonic transducer, wherein the ultrasound is transmitted and/or received within the flow channel at a pocket or bulge protruding into the flow channel.

Therefore, the ultrasonic transducer is mounted according to the clamp-in principle mentioned in the introduction. An oscillating member of the ultrasonic transducer couples onto a partial region of the channel wall, in particular by direct contact, wherein the oscillating member is supported by the partial region and may also be pressed onto the partial region by spring force or the like. Then, the invention starts from the idea to create additional degrees of freedom for the arrangement of the ultrasonic transducer by forming a pocket or bulge in the channel wall which protrudes into the flow channel. This enables selection of the orientation of the ultrasonic transducer by means of the geometry of the bulge, and at the same time to still use the partial region of the channel wall as a membrane.

The invention has the advantage that it is possible to combine the advantages of the clamp-in mounting and the free mounting of an ultrasonic transducer protruding into the flow. Therefore, a completely closed, smooth inner surface is provided to the fluid which prevents deposits and enables an easy, complete cleaning. At the same time, the ultrasonic transducer can be virtually freely aligned in connection with the design of the bulge. By that, longer measurement paths through the fluid and thus higher measurement accuracy can be achieved.

The ultrasonic transducer preferably is arranged at a small transmission angle with respect to the flow direction of the fluid. In this description, a preferable feature is an advantageous, but completely optional feature. Moreover, transmission angle also refers to the reception angle, depending on whether the ultrasonic transducer acts as a transmitter or a receiver. A small transmission angle in particular is an angle of at most 25°, at most 10° or even at most 5°. The part of the channel wall acting as a membrane thus preferably is arranged at an edge of the bulge and oriented very steeply with respect to the longitudinal axis of the piping, namely, essentially at the difference angle of a right angle and the small transmission angle. A correspondingly flat ultrasonic path results from the small transmission angle, which, in particular for small nominal diameters of the piping, can be sufficiently long despite the geometrically confined conditions.

The ultrasonic transducer preferably is arranged in a cavity of the channel wall, the cavity being open to the outside and comprising the partial region to the inside. The cavity in essence is the inside of the bulge, i.e. the side of the channel wall facing away from the flow channel, where the ultrasonic transducer can be inserted from the outside (clamp-in). At least in the partial region, the channel wall of the cavity or the bulge, respectively, has less material than the rest of the channel wall, i.e. is thin-walled. This facilitates the desired function as a membrane of the ultrasonic transducer.

The bulge preferably comprises, one after the other in a longitudinal direction of the piping, a rounded flow guiding region and the partial region. The partial region is an important reason to form the bulge in the first place, namely to make its orientation independent from the orientation of the rest of the channel wall and thus, for example, to be able to achieve a small transmission angle. The flow guiding region is formed to, as far as possible, mitigate the effect of the bulge protruding into the flow channel as a source of flow interference, and provide a homogenous flow in spite of the bulge. The goal is to have a measurement path which actually is representative for the entire flow in order to achieve an accurate measurement.

The flow guiding region preferably is formed with a slow rise and the partial region with an abrupt fall. The slow rise ensures only little interference of the flow. In the abruptly falling partial region, the bulge forms an almost vertical wall with respect to the central axis of the piping, so that the partial region can act as a membrane for ultrasound transmitted or received at small angles. The numbers mentioned above for the transmission angles in particular also apply for the terms slow rise and abrupt fall. The partial region may be a part of the original channel wall or the bulge, respectively. As an alternative, the membrane initially is cut for example from a metal sheet, an opening is cut into the abruptly falling region of the bulge, and the membrane is welded into the opening. The result in both cases is a closed inner surface of the measurement body.

The channel wall preferably comprises a slowly rising recess below the partial region and opposite the flow guiding region. The partial region is therefore arranged in the channel wall recessed before or behind the bulge. The recess then returns the recessed level back to the level of the rest of the channel wall with increasing distance from the bulge, and slowly in order to interfere with the flow as little as possible. The recess for example has a u-shaped profile in a sectional view whose depth continuously decreases with the distance to the membrane and then becomes the profile of the piping.

The bulge, in a sectional view of the piping, preferably has a central elevation. The bulge, therefore, is not a simple ramp in the flow, which would run horizontal in a sectional view, but forms a profile in the sectional view with a largest elevation at the center. This allows the fluid to not only flow across the bulge, but also to bypass at the sides.

The bulge, in a sectional view of the piping, preferably has a rounded, wavelike W-profile with the elevation at its center. The fluid bypassing at the sides is therefore guided by means of the W-profile for to interfere with the flow as little as possible.

The measurement body preferably comprises a tapered and subsequently re-extending flow region. This flow region consequently has a bottle neck or, expressed in other words, is formed as a Venturi channel. In contrast to the previous paragraphs, this geometrical configuration relates to the longitudinal rather than the transverse direction of the piping. At least the major part of the measurement path runs within the flow region, and therefore a reproducible flow should have formed there. The better the points crossed by the measurement path represent the cross section, the more accurate is the measurement of the flow rate.

The channel wall of the flow region preferably continues the rise of the recess. Then, the channel wall rises smoothly and tangentially, thus seamlessly for the flow, from the recess to the bottle neck of the Venturi channel.

Preferably, at least two ultrasonic transducers are provided which are arranged opposite to one another with respect to the flow channel section, the ultrasonic transducers alternately acting as a transmitter and a receiver and forming a measurement path between one another for determining a time of flight difference of an ultrasonic signal transmitted with the flow of the fluid and an ultrasonic signal transmitted against the flow of the fluid. The ultrasonic measurement apparatus thus is configured for a time of flight difference method. Arranged opposite to one another means that a measurement path runs on a line of sight between the ultrasonic transducers through the flow channel and the fluid flowing therein. Due to the possibility of flat measurement paths, i.e. measurement paths inclined at a small transmission angle, larger time of flight differences are created which can be detected and evaluated more easily and with greater accuracy. It is also conceivable to form additional measurement paths with additional ultrasonic transducers. For small nominal diameters, however, only one measurement path is preferably used.

The measurement body preferably has an inner geometry which is symmetrical with respect to its center. This also implies that the measurement body can be used for both flow directions of the fluid. The contour of the measurement body presented to the fluid is the same from both directions. Depending on the embodiment, the contour may be a slow rise of the bulges from the direction of the inlet and outlet openings and then, at the opposite side of the bulge and in the direction of the central Venturi channel, an abruptly falling partial region of the channel wall being used as a membrane. The symmetry preferably is symmetry with respect to a point, i.e. one bulge is located at the top and one bulge is located at the bottom, so that the measurement path formed between the ultrasonic transducers crosses the flow through the Venturi channel. In addition, the measurement body also is symmetric with respect to a vertical central plane of the piping, which therefore extends centrally through the bulges.

The inventive method can be modified in a similar manner and shows similar advantages. Such advantageous features are described in the sub claims following the independent claims in an exemplary, but non-limiting manner. An assembly method according to the invention can of course also be used to remove or replace an ultrasonic transducer.

The invention will be explained in the following also with respect to further advantages and features with reference to exemplary embodiments and the enclosed drawing. The Figures of the drawing show in.

Figure 1:
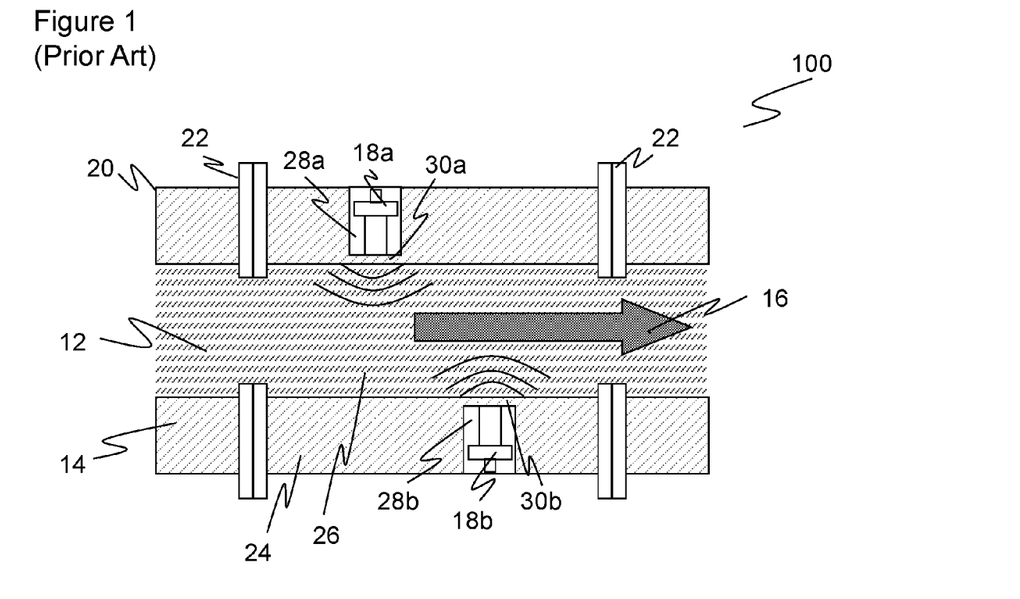
FIG. 1 a simplified schematic view of a conventional ultrasonic measurement apparatus according to the clamp-in principle.

FIG. 1 shows a simplified schematic view of an ultrasonic measuring apparatus 100 according to the prior art for measuring the flow velocity, or the flow rate calculated from that, respectively, of a fluid 12 in a piping 14 which flows in a direction illustrated by an arrow 16. The flow velocity is for example determined in a control and evaluation unit, not shown, by the time of flight difference method explained in the introduction, by evaluation of the time of flight at transmission and detection of ultrasonic signals between a pair of ultrasonic transducers 18a-b with and against the flow. In other embodiments, both only one ultrasonic transducer and a plurality of ultrasonic transducers may be provided.

The ultrasonic measurement apparatus 100 or flow meter comprises a measurement body 20, which is inserted into the piping 14 at connection points 22, for example by flange connections, and ultimately in the mounted state forms a part of the piping 14. In a channel wall 24 of the measurement body 20, which surrounds the actual flow channel 26, pockets or cavities 28a-b are provided where the ultrasonic transducers 18a-b are mounted. To the inside, thin-walled regions 30a-b remain from the channel wall 24 at the cavities 28a-b, which at the same time act as a membrane of the ultrasonic transducers 18a-b and are excited to oscillate by the oscillating member or ceramic of the ultrasonic transducer 18a-b, or vice-versa excite the oscillating member of the ultrasonic transducer 18a-b to oscillate upon impinging of an ultrasonic signal from the flow channel 26. The thin-walled regions 30a-b are strong enough to withstand an expected inner channel pressure of for example 15 bar. The channel wall 24 provides a closed inner surface without recesses or projections where deposits could form.

The conventional ultrasonic measurement apparatus 100 does not allow any degrees of freedom for orienting the ultrasonic transducer 18a-b. The transmission and reception direction, respectively, are vertical or at least near vertical to a central axis of the piping 14 due to the construction.

Figure 2:
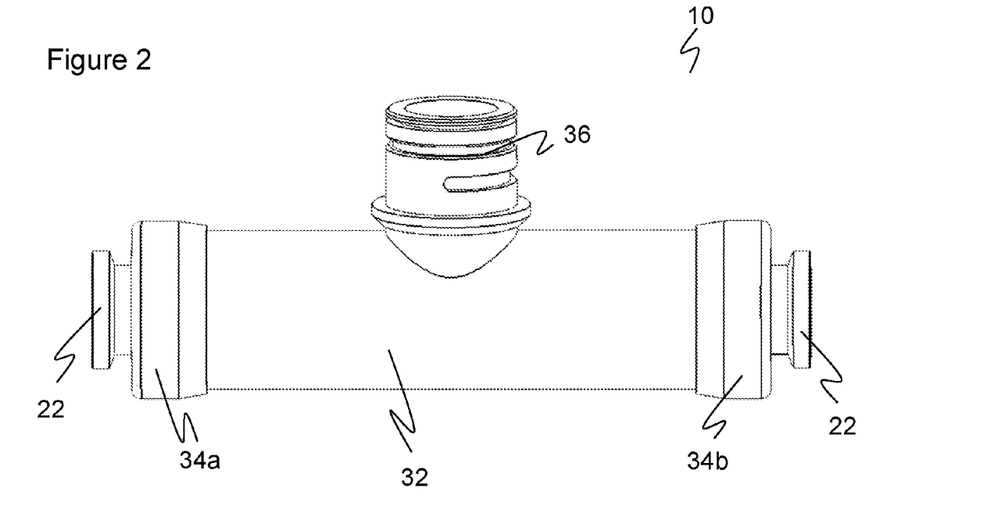
FIG. 2 a three-dimensional overall view of an embodiment of an ultrasonic measurement apparatus according to the invention.

FIG. 2 shows a three-dimensional overall view of an embodiment of an ultrasonic measurement apparatus 10, or flow meter, from the outside. Here and throughout the description, like reference numerals designate the same or corresponding features. The measurement body 20 in this view is hidden in a housing 32 which protects the ultrasonic measurement apparatus 10 against the outside and provides a smooth outer contour to facilitate cleaning. The housing 32 is secured by means of two nuts 34a-b which seal to the inside by hidden O-rings. These seal rings also provide an acoustic decoupling of measurement body 20 and housing 32, so that the housing 32 does not form a bridge for structure-bound sound. A connecting region 36 protrudes at an angle of 90° wherein electronic lines can be arranged. At the connection region 36, a unit with interfaces and power supply and evaluation circuits, not shown, may be arranged. The ultrasonic measurement apparatus 10 is in particular usable for small nominal diameters like DN15, DN25, or DN50.

Figure 3:
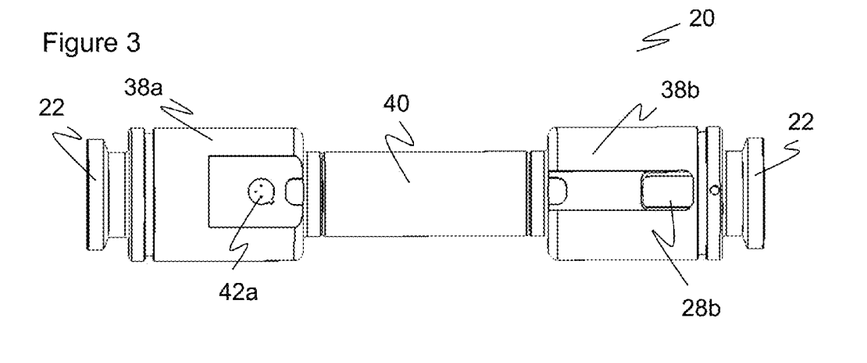
FIG. 3 a three-dimensional view of a measurement body of the ultrasonic measurement apparatus according to FIG. 2 without housing.

FIG. 3 shows a three-dimensional view of the measurement body 20 according to FIG. 2 after removing the housing 32. The measurement body 20 in the shown exemplary embodiment has symmetry to its central point and is explained also with reference to a longitudinal sectional view through the measurement body 20 according to FIG. 4, wherein the measurement body 20 in FIG. 4 is rotated relative to FIG. 3 by 90° about its longitudinal axis.

Measurement body 20 is composed of two transducer areas 38a-b and a flow region 40 arranged in between. Segmentation facilitates machine manufacturing of a complex geometry of the individual elements 38a-b, 40. The ultrasonic transducers 18a-b are inserted into the cavities 28a-b of the transducer regions 38a-b from the outside and then are aligned with each other to form the measurement path. The thin-walled regions 30a-b on the one hand provide a closed inner surface of the measurement body 20 and on the other hand form the membrane of the respective ultrasonic transducer 18a-b. In circumferential direction on the opposite side of the cavities 28a-b there is still space for additional elements, for example temperature sensors 42a-b whose measurements may be used for a correction of the ultrasound evaluations.

One goal of the design of the measurement body 20 is to increase the time of flight difference for a time of flight difference method. Therefore, the flow region 40 is formed like a Venturi in an embodiment. This is illustrated in a schematic view in FIG. 5 similar to the detailed sectional view of FIG. 4. The flow region 40 comprises a bottle neck of radius $R_i$, with the cross section symmetrically tapering from both sides from original radius $R_a$ to $R_i$. This increases the absolute flow velocity, so that sufficient time of flight differences can be measured also for smaller inflow velocities.

Figure 4:
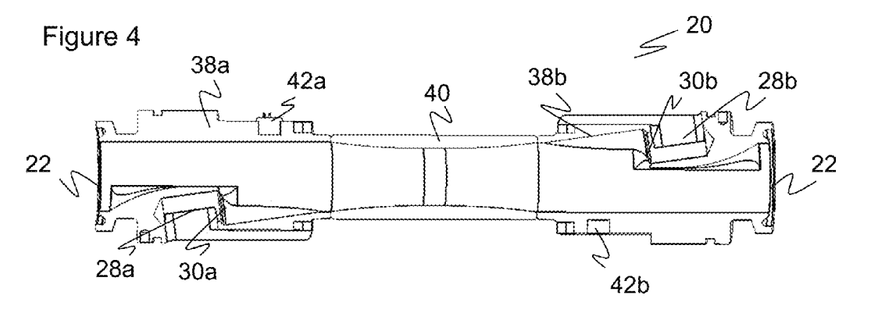
FIG. 4 a longitudinal section through the measurement body according to FIG. 3.
Figure 5:
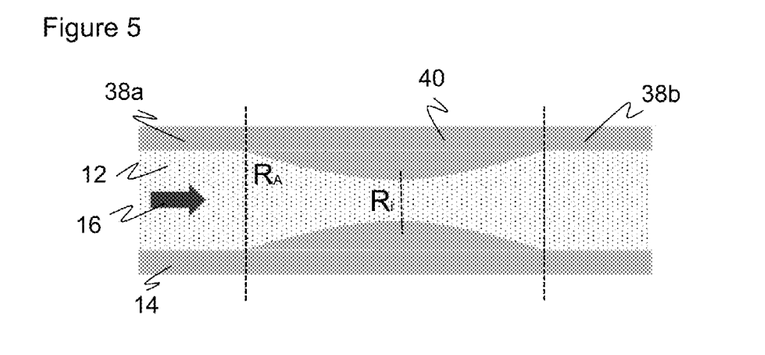
FIG. 5 a schematic longitudinal section similar to FIG. 4 in order to explain the Venturi principle.
Figure 6A:
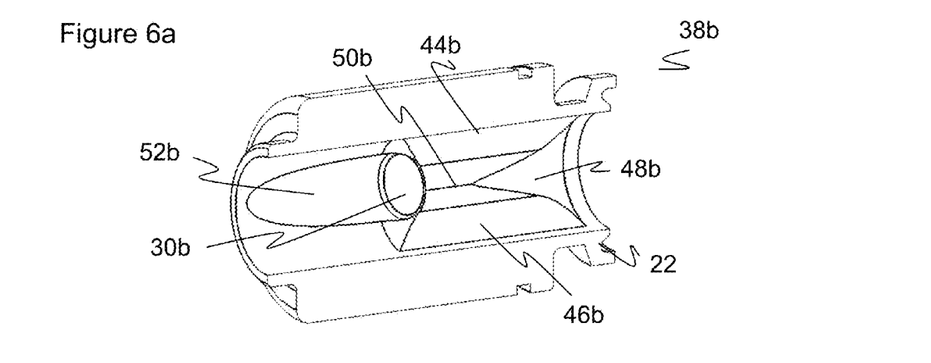
FIG. 6a a three-dimensional view, from above with a lateral offset, of a section through a transducer region of the measurement body.
Figure 6B:
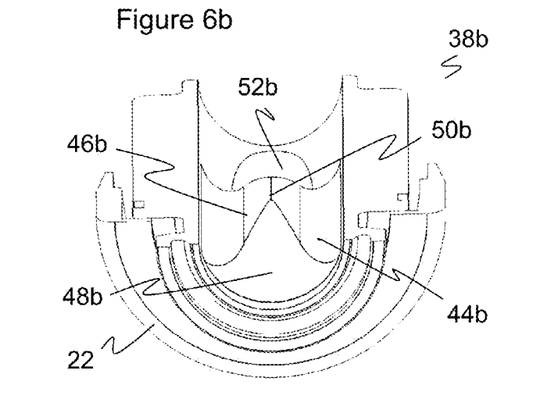
FIG. 6b a three-dimensional view of the transducer region from the outside.
Figure 6C:
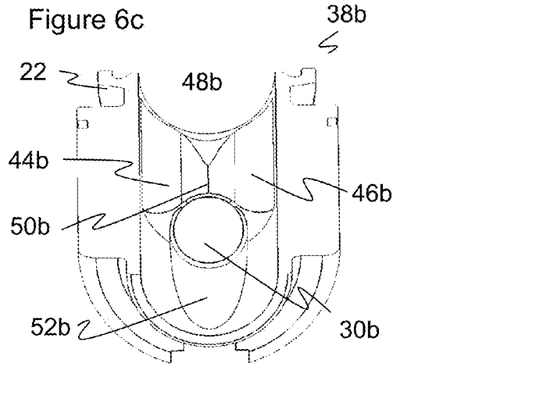
FIG. 6c a three-dimensional view of the transducer region from the inside.
Figure 6D:
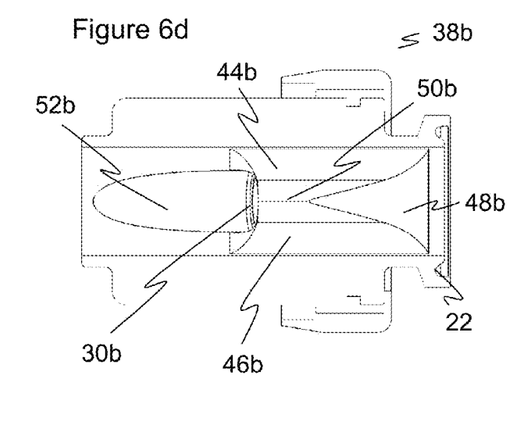
FIG. 6d a longitudinal section of the transducer region.
Figure 6E:
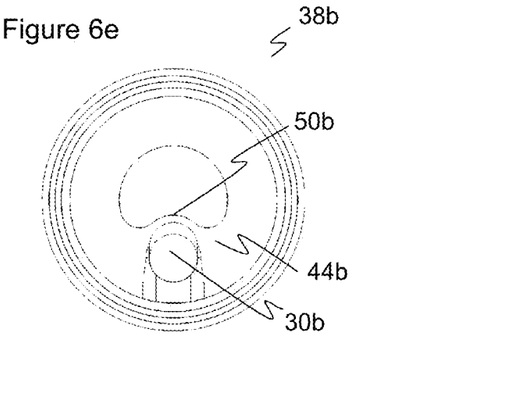
FIG. 6e a cross section of the transducer region.

As can be seen in FIG. 4, the ultrasonic transducers 18a-b protrude into the flow channel 26. This is done to achieve a direct measurement path of sufficient length, in particular for small nominal diameters, which can be considerably longer than the channel diameter due to its flat angle. At the same time, this constitutes flow barriers leading to eddies. These eddies can be harmonized by an organic shaping in the inflow within the transducer regions 38a-b, which is another goal of the design of measurement body 20 and explained in more detail below with reference to FIGS. 6 and 7. However, it cannot entirely be avoided that the flow profile of the velocity is distorted, which leads to an error in the calculation of the volume flow, because the accuracy depends on the degree of the single measurement path being able to represent the flow. A homogenous flow profile can be achieved for most inflow velocites by the ratio of inner radius $R_i$ and outer radius $R_A$ of the flow region 40. The limit is observance of a permissible pressure loss. The flow region 40 with its Venturi shape, therefore, provides a velocity increase and a homogenization of the velocity field.

FIG. 6 shows different views of a transducer area 38b. FIG. 6a is a view, from above with a lateral offset, of a section through the transducer region 38b, FIG. 6b is a three-dimensional view from the outside, FIG. 6c conversely a three-dimensional view from the inside, FIG. 6d is a longitudinal section, and FIG. 6e is a cross section. The other transducer region 38a, which is now shown, has a symmetrical configuration.

The transducer region 38b comprises a pocket or bulge 44b which protrudes into the flow channel 26 and wherein the ultrasonic transducer 18b is mounted. The bulge 44 thus is that region of the channel wall 24 which limits the cavity 28b in the channel wall 24 from the flow channel 26. Due to the bulge 44b, it is possible to orient the thin-walled region 30b acting as a membrane very steeply with respect to the rest of the channel wall 24, instead of virtually parallel as in the prior art, and to thus achieve a flat measurement path. The deviation of the orientation of the membrane from a vertical line of only a few degrees, for example 8°, corresponds to the transmission angle or the reception angle of the ultrasound and thus the orientation of the measuring path.

The membrane is designed to ensure efficient sound transmission, and to that end should have a reproducible smooth surface quality and uniform thickness. In addition, the membrane of course has to withstand the pressure of the fluid 14 in any situation. The membrane may for example be laser cut from a stainless steel sheet of the same material as the measurement body 20 and, again by means of a laser, be welded into the measurement body 20. The thin-walled region 30b acting as a membrane in an embodiment has a larger diameter than the ultrasonic transducer 18b, for example 8 mm as compared to 5 mm. The remaining cavity 28b can be filled with a dampening material like an epoxy resin. Thereby, the ultrasonic transducer 18b is mechanically stabilized, and the structure-bound sound transmission is suppressed.

The bulge 44b is a flow barrier. By its shape it is ensured that the flow bypasses this barrier in an optimized way. The shaping has several aspects which individually or in combination lead to the desired result. Without the special shaping, and using a simple ramp instead of the rounded bulge 44b, the step-like inflow region provides a tearing edge which causes the flow to stall over the entire width. As a result, there is a shear layer over a substantial portion, for example ⅓, of the flow profile. The ultrasonic signals have to cross the shear layer which substantially increases the background noise because the region where the time of flight of the ultrasound actually depends on a flow velocity to be measured is reduced accordingly. The shaping of the bulge 44b therefore aims at reducing the shear layer as much as possible.

In principle, the shaping could provide a flow which, within the relevant velocity range, does not stall at all. This requires very small curvatures for example with angles of at most 4°, which generally are not allowed by the construction of the ultrasound measurement apparatus 10. Then, an optimal trade-off between size of the apparatus and a shaping for a small shear layer has to be found.

One aspect of the shaping of bulge 44b is a flatly or slowly rising flow guiding region 46b, which in particular also comprises a widening initial ramp 48b continuing the original circular profile of the piping 14. When viewed in cross section and further on into the inner part of the measurement body 20, the flow guiding region 46 is formed like a rounded, W-shaped wave with a largest elevation 50b at the center. Therefore, side regions are generated where the fluid 14 may bypass the elevation 50b so that the effective extent of the bulge 44b as a flow barrier is substantially reduced. At the same time, the rounded wave form ensures that there are no sharp edges where the flow easily could stall.

Where the flow guiding region 46b is high enough, the initially slowly rising 44b bulge gives way to an abruptly falling wall which includes the thin-walled region 30b acting as a membrane. The transition point preferably again is rounded in order to at least partially prevent stalling of the flow.

Further on from the thin-walled region 30b into the inner part of the measurement body 20, a recess 52b is arranged behind the bulge 44b. The recess 52b is deep enough so that the thin-walled region 30b with part of its height can be set into the channel wall 24, and thus can be placed although the bulge 44b does not quite have sufficient height for the thin-walled region 30b. Afterwards, the recess 52b returns the recessed level back to the level of the rest of the channel. The slope of the recess 52b is preferably continued by the Venturi shape of the flow guiding region, so that at this transition again no interfering edge is generated.

Figure 7:
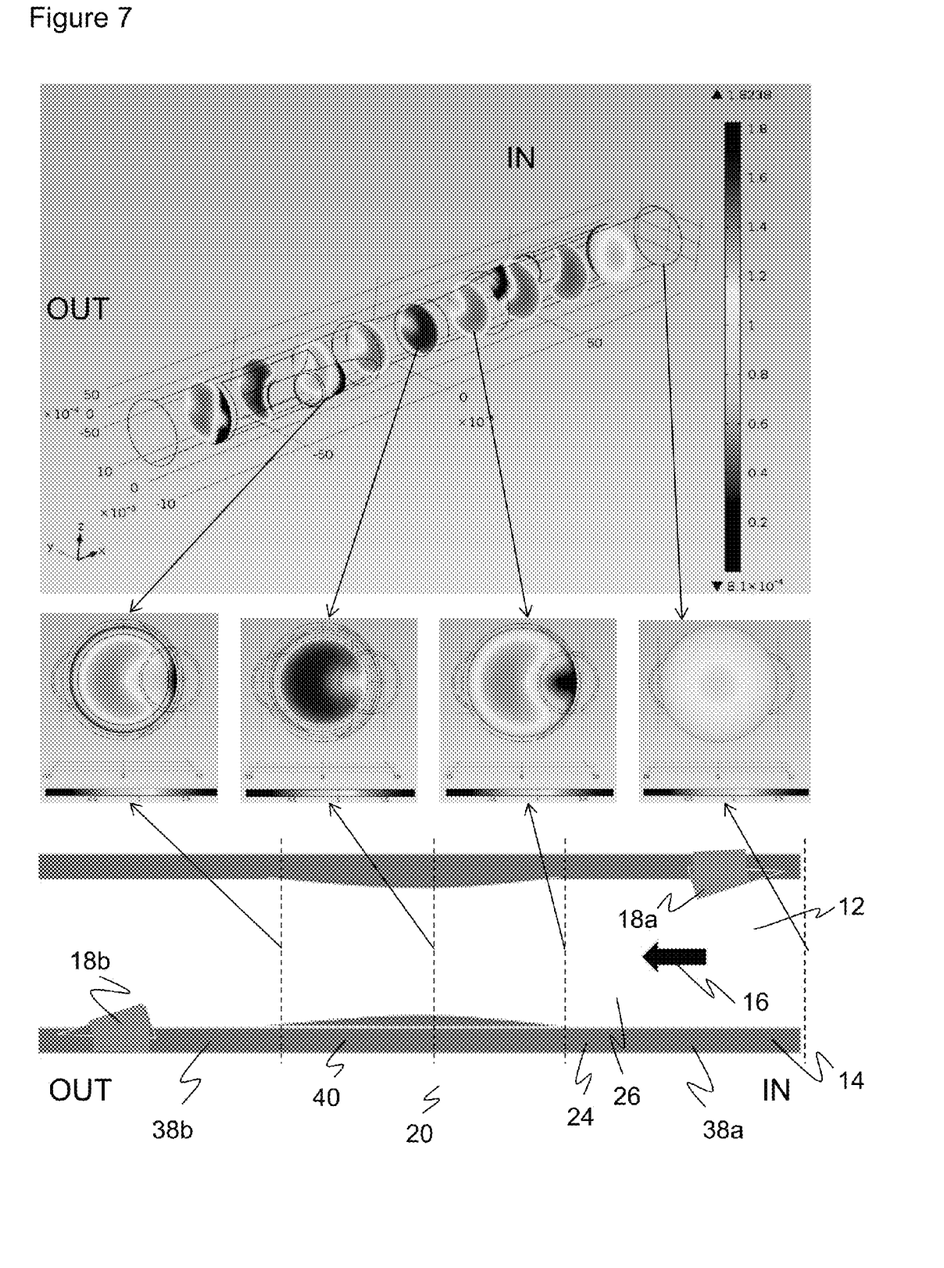
FIG. 7 an illustration showing simulated flow characteristics in the measurement body.

FIG. 7 shows the result of this optimized shaping of the transducer regions 30a-b and the flow guiding region 40 from a simulation. At the bottom of FIG. 7, the measurement body 20 is again shown as a reference. This corresponds to the three-dimensional view in the upper part of FIG. 7, where various cross sections are shown at their respective position within the measurement body 20. Some of these cross sections are selected in the middle of FIG. 7 to show the flow profiles in more detail at positions which are particularly relevant to the understanding and the measurement, respectively. Several arrows indicate the assignment of positions in the measurement body 20 and the flow profiles simulated at those positions. It should be noted that the flow direction 16 in FIG. 7 is reversed relative to the earlier Figures, but this does not have any technical significance.

No comparative picture of a flow pattern without the optimized shaping and a simple ramp instead of the bulges 44a-b is shown. There, the shear layer contributing only to the background noise of the measurement would take at least ⅓ of the respective cross-sectional area. In contrast, FIG. 7 shows that the lee eddy from the tearing edge at the end of the flow guiding region 46a, in the transition to the abruptly falling thin-walled region 30a-b, also does cause a shear layer. This is inevitable unless one does not arrange the ultrasonic transducers 18a-b in a bulge 44a-b. However, thanks to the optimized geometry, the shear layer only takes a very small area ratio of the respective cross sections, and at the center of the Venturi-shaped flow region 40, the flow is almost completely homogenized. The shaping of the bulge 44a-b ensures that no eddies are formed at other positions, including the fluid 12 bypassing at the sides of the bulge 44a-b which considerably contributes to the lower extent of the shear layer. Overall, a flow behavior can be achieved which enables an accurate measurement.

The invention claimed is:

1. An ultrasonic measurement apparatus (10) for determining a fluid velocity of a fluid (12) flowing in a piping (14), the apparatus (10) having a measurement body (20) inserted into the piping (14) and thus forming a section of the piping (14), the measurement body (20) comprising a flow channel (26) for the fluid (12) and a surrounding channel wall (24), wherein at least one ultrasonic transducer (18a-b) is mounted from the outside on the channel wall (24) so that an oscillating member of the transducer (18a-b) couples onto a partial region (30a-b) of the channel wall (24) and thus the partial region (30a-b) acts as an oscillating membrane of the ultrasonic transducer (18a-b), wherein the ultrasonic transducer (18a-b) is arranged within a bulge (44) of the channel wall (24) which protrudes into the flow channel (26), wherein the bulge (44) comprises, one after the other in a longitudinal direction of the piping (44), a rounded flow guiding region (46a-b) and the partial region (30a-b).

2. The ultrasonic measurement apparatus (10) according to claim 1, wherein the ultrasonic transducer (18a-b) is arranged at a small transmission angle with respect to the flow direction of the fluid (12).

3. The ultrasonic measurement apparatus (10) according to claim 1, wherein the ultrasonic transducer (18a-b) is arranged in a cavity (28a-b) of the channel wall (24), the cavity (20a-b) being open to the outside and comprising the partial region (30a-b) to the inside.

4. The ultrasonic measurement apparatus (10) according to claim 1, wherein the flow guiding region (46a-b) is formed with a slow rise and the partial region (30a-b) with an abrupt fall.

5. The ultrasonic measurement apparatus (10) according to claim 1, wherein the channel wall (24) comprises a slowly rising recess (52a-b) below the partial region (30a-b) and opposite the flow guiding region (46a-b).

6. The ultrasonic measurement apparatus (10) according to claim 5, wherein the channel wall (24) of a flow region (40) continues the rise of the recess (52a-b) to ensure the channel wall rises smoothly and tangentially from the recess.

7. The ultrasonic measurement apparatus (10) according to claim 1, wherein at least two ultrasonic transducers (18a-b) are provided which are arranged opposite to one another with respect to the flow channel section, the ultrasonic transducers (18a-b) alternately acting as a transmitter and a receiver and forming a measurement path between one another for determining a time of flight difference of an ultrasonic signal transmitted with the flow of the fluid (12) and an ultrasonic signal transmitted against the flow of the fluid (12).

8. An ultrasonic measurement apparatus (10) for determining a fluid velocity of a fluid (12) flowing in a piping (14), the apparatus (10) having a measurement body (20) inserted into the piping (14) and thus forming a section of the piping (14), the measurement body (20) comprising a flow channel (26) for the fluid (12) and a surrounding channel wall (24), wherein at least one ultrasonic transducer (18a-b) is mounted from the outside on the channel wall (24) so that an oscillating member of the transducer (18a-b) couples onto a partial region (30a-b) of the channel wall (24) and thus the partial region (30a-b) acts as an oscillating membrane of the ultrasonic transducer (18a-b), wherein the ultrasonic transducer (18a-b) is arranged within a bulge (44) of the channel wall (24) which protrudes into the flow channel (26), wherein the bulge (44a-b), in a sectional view of the piping (14), has a central elevation (50a-b).

9. The ultrasonic measurement apparatus (10) according to claim 8, wherein the bulge (44a-b), in a sectional view of the piping (14), has a rounded, wavelike W-profile with the elevation (50a-b) at its center.

10. An ultrasonic measurement apparatus (10) for determining a fluid velocity of a fluid (12) flowing in a piping (14), the apparatus (10) having a measurement body (20) inserted into the piping (14) and thus forming a section of the piping (14), the measurement body (20) comprising a flow channel (26) for the fluid (12) and a surrounding channel wall (24), wherein at least one ultrasonic transducer (18a-b) is mounted from the outside on the channel wall (24) so that an oscillating member of the transducer (18a-b) couples onto a partial region (30a-b) of the channel wall (24) and thus the partial region (30a-b) acts as an oscillating membrane of the ultrasonic transducer (18a-b), wherein the ultrasonic transducer (18a-b) is arranged within a bulge (44) of the channel wall (24) which protrudes into the flow channel (26), wherein the measurement body (20) comprises a tapered and subsequently re-extending flow region (40).

* * * * *